(12) United States Patent
Wang et al.

(10) Patent No.: US 10,474,472 B2
(45) Date of Patent: Nov. 12, 2019

(54) OPERATING SYSTEM ESTABLISHING METHOD AND APPARATUS

(71) Applicant: Huawei Technologies Co., Ltd., Shenzhen, Guangdong (CN)

(72) Inventors: Zhandong Wang, Shenzhen (CN); Zijun Li, Shenzhen (CN); Jingyu Lai, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

(21) Appl. No.: 15/107,411

(22) PCT Filed: Apr. 24, 2014

(86) PCT No.: PCT/CN2014/076125
§ 371 (c)(1),
(2) Date: Jun. 22, 2016

(87) PCT Pub. No.: WO2015/161483
PCT Pub. Date: Oct. 29, 2015

(65) Prior Publication Data
US 2017/0123813 A1    May 4, 2017

(51) Int. Cl.
*G06F 9/00*      (2006.01)
*G06F 15/177*    (2006.01)
(Continued)

(52) U.S. Cl.
CPC .............. *G06F 9/4406* (2013.01); *G06F 8/63* (2013.01); *G06F 9/4451* (2013.01); *H04L 67/34* (2013.01)

(58) Field of Classification Search
CPC .................................................... G06F 9/4406
See application file for complete search history.

(56) References Cited

U.S. PATENT DOCUMENTS 6,993,642 B2 *  1/2006  Burkhardt ................. G06F 8/63
                                                         713/1
8,140,683 B2    3/2012  French et al.
(Continued)

FOREIGN PATENT DOCUMENTS

CA      2773095 A1    9/2013
CN    101059768 A    10/2007
(Continued)

*Primary Examiner* — Mohammed H Rehman
(74) *Attorney, Agent, or Firm* — Kilpatrick Townsend & Stockton LLP

(57) ABSTRACT

Embodiments of the present invention provide an operating system establishing method and apparatus. The operating system establishing method in the present invention includes: starting a just enough operating system and enabling a basic application service; acquiring a data selection instruction input by a user, determining a profile providing server according to the data selection instruction, and acquiring operating system information from the profile providing server; and accessing an operating system providing server according to the operating system information, acquiring an operating system copy, and deploying the operating system copy in an operating system container to establish an operating system. In the embodiments of the present invention, hardware and an operating system that are of a terminal are decoupled, which achieves a purpose that a terminal may establish an operating system according to a user preference.

8 Claims, 12 Drawing Sheets

(51) Int. Cl.
  *G06F 9/4401* (2018.01)
  *H04L 29/08* (2006.01)
  *G06F 9/445* (2018.01)
  *G06F 8/61* (2018.01)

(56) References Cited

U.S. PATENT DOCUMENTS

| | | | | |
|---|---|---|---|---|
| 9,210,195 B2* | 12/2015 | Li | | H04L 65/00 |
| 2002/0073201 A1* | 6/2002 | French | | G06F 9/441 |
| | | | | 709/227 |
| 2009/0164493 A1* | 6/2009 | Johnsgard | | G06F 17/24 |
| 2010/0198772 A1* | 8/2010 | Silverman | | G06Q 30/02 |
| | | | | 706/52 |
| 2012/0284495 A1* | 11/2012 | Domsch | | G06F 9/4416 |
| | | | | 713/2 |
| 2013/0067376 A1* | 3/2013 | Kim | | G06F 3/0488 |
| | | | | 715/769 |
| 2014/0172783 A1* | 6/2014 | Suzuki | | G06F 8/63 |
| | | | | 707/609 |
| 2014/0280589 A1* | 9/2014 | Atkinson | | H04L 65/403 |
| | | | | 709/204 |
| 2014/0366016 A1 | 12/2014 | Wang et al. | | |

FOREIGN PATENT DOCUMENTS

CN    101655798 A    2/2010
WO    2013/123829 A1    8/2013

\* cited by examiner

OPERATING SYSTEM ESTABLISHING METHOD AND APPARATUS

CROSS REFERENCE TO RELATED APPLICATIONS

The present application claims priority under 35 U.S.C. § 365 to International Patent Application No. PCT/CN2014/076125 filed Apr. 24, 2014 which is incorporated herein by reference into the present disclosure as if fully set forth herein.

TECHNICAL FIELD

Embodiments of the present invention relate to communications technologies, and in particular, to an operating system establishing method and apparatus.

BACKGROUND

As a hardware technology is increasingly mature and a smart technology develops, an operating system deployed on a terminal device is also increasingly diverse. From an original Symbian (Symbian) system to a windows mobile (Windows Mobile, WM for short) system later and then to an android (Android) system and an iPhone mobile operating system (IOS) that abruptly develop in recent years, each operating system has its own feature and advantage and disadvantage, and for a preferred operating system, a user has a personalized need on aspects such as an attribute, performance, a user interface (User Interface, UI for short), and interaction design, so that the operating system becomes one piece of data of a profile (Profile) of the user. If the operating system is a soul of a terminal, hardware is a body of the terminal. Under a condition of an existing technology, the operating system is generally fixed on hardware of the terminal, or a type of the hardware of the terminal is applicable only to a fixed operating system, that is, the operating system and the hardware that are of the terminal are bound together.

On a current market, some terminals can provide multiple different operating systems at the same time for selection when the user starts the terminal, for example, an operating system selection interface when the user starts a personal computer (Personal Computer, PC for short). The solution is that complete copies of the multiple different operating systems are locally stored on the terminal at the same time, and a computer system is booted, by using different BOOT.INI boot files, to enter a corresponding operating system.

However, a range of operating systems available for selection in the foregoing solution is still limited and cannot be expanded. Decoupling between the operating system and the hardware that are of the terminal is still not implemented. In addition locally storing the copies of the multiple operating systems at the same time means occupying much local storage space.

SUMMARY

Embodiments of the present invention provide an operating system establishing method and apparatus, so as to achieve a purpose that a terminal may establish an operating system according to a user preference.

According to a first aspect, an embodiment of the present invention provides an operating system establishing method, including:

starting a just enough operating system, and enabling a basic application service, where the just enough operating system includes a basic application service module, an operating system core library module, and an instruction translation module, where the operating system core library includes file storage, execution of supporting the basic application service, Internet access, and input/output, where the basic application service includes a call application, an SMS message application, a browser application, and an input method application;

acquiring a data selection instruction input by a user, determining a profile providing server according to the data selection instruction, and acquiring operating system information from the profile providing server; and accessing an operating system providing server according to the operating system information, acquiring an operating system copy, and deploying the operating system copy in an operating system container to establish an operating system, where the operating system container is used to run the operating system copy.

With reference to the first aspect, in a first possible implementation manner of the first aspect, the data selection instruction includes identification ID that is selected by the user and that is of the profile providing server and ID of the user; and the acquiring a data selection instruction input by a user, determining a profile providing server according to the data selection instruction, and acquiring operating system information from the profile providing server includes:

acquiring the data selection instruction input by the user; determining, according to the ID of the profile providing server, the profile providing server that provides a service; accessing, by addressing, the profile providing server according to the ID of the user; and acquiring the operating system information from the profile providing server, where the operating system information includes information about the operating system providing server.

With reference to the first aspect or the first possible implementation manner of the first aspect, in a second possible implementation manner of the first aspect, after the accessing an operating system providing server according to the operating system information, acquiring an operating system copy, and deploying the operating system copy in an operating system container to establish an operating system, the method further includes:

sending a profile request message to the profile providing server, acquiring a profile of the user from the profile providing server, and completing personalized processing of the operating system according to the profile of the user, where the profile request message includes the ID of the user and the information about the operating system providing server.

With reference to the first aspect and either of the first to the second possible implementation manners of the first aspect, in a third possible implementation manner of the first aspect, after the starting a just enough operating system, and enabling a basic application service, the method further includes:

acquiring a data exchange function enabling instruction input by the user, and enabling a data exchange service according to the data exchange function enabling instruction.

According to a second aspect, an embodiment of the present invention provides an operating system establishing method, including:

receiving a data request message sent by a terminal; and sending, to the terminal, information about a user according to the data request message, so that the terminal establishes an operating system according to the information about the user.

With reference to the second aspect, in a first possible implementation manner of the second aspect, the receiving a data request message sent by a terminal includes:

receiving an operating system information request message sent by the terminal, where the operating system information request message includes identification ID of the user; and the sending, to the terminal, information about a user according to the data request message includes:

sending, to the terminal, operating system information of the user according to the operating system information request message, where the operating system information of the user includes information about an operating system providing server.

With reference to the second aspect, in a second possible implementation manner of the second aspect, the receiving a data request message sent by a terminal includes:

receiving a profile request message sent by the terminal, where the profile request message includes ID of the user and information about the operating system providing server; and the sending, to the terminal, information about a user according to the data request message includes:

sending, to the terminal, a profile of the user according to the profile request message, where the profile of the user includes personalized information of the operating system.

According to a third aspect, an embodiment of the present invention provides an operating system establishing method, including:

receiving an operating system request message sent by a terminal; and sending, to the terminal, an operating system copy according to the operating system request message, so that the terminal establishes an operating system according to the operating system copy.

According to a fourth aspect, an embodiment of the present invention provides an operating system establishing apparatus, including:

a starting module, configured to: start a just enough operating system, and enable a basic application service, where the just enough operating system includes a basic application service module, an operating system core library module, and an instruction translation module, where the operating system core library includes file storage, execution of supporting the basic application service, Internet access, and input/output, where the basic application service includes a call application, an SMS message application, a browser application, and an input method application;

an operating system information acquiring module, configured to: acquire a data selection instruction input by a user, determine a profile providing server according to the data selection instruction, and acquire operating system information from the profile providing server; and an operating system establishing module, configured to: access an operating system providing server according to the operating system information, acquire an operating system copy, and deploy the operating system copy in an operating system container to establish an operating system, where the operating system container is used to run the operating system copy.

With reference to the fourth aspect, in a first possible implementation manner of the fourth aspect, the data selection instruction includes identification ID that is selected by the user and that is of the profile providing server and ID of the user; and the operating system information acquiring module is specifically configured to: acquire the data selection instruction input by the user; determine, according to the ID of the profile providing server, the profile providing server that provides a service; access, by addressing, the profile providing server according to the ID of the user; and acquire the operating system information from the profile providing server, where the operating system information includes information about the operating system providing server.

With reference to the fourth aspect or the first possible implementation manner of the fourth aspect, in a second possible implementation manner of the fourth aspect, the apparatus further includes:

a personalized processing module, configured to: send a profile request message to the profile providing server, acquire a profile of the user from the profile providing server, and complete personalized processing of the operating system according to the profile of the user, where the profile request message includes the ID of the user and the information about the operating system providing server.

With reference to the fourth aspect and either of the first to the second possible implementation manners of the fourth aspect, in a third possible implementation manner of the fourth aspect, the apparatus further includes:

a data exchange enabling module, configured to: acquire a data exchange function enabling instruction input by the user, and enable a data exchange service according to the data exchange function enabling instruction.

According to a fifth aspect, an embodiment of the present invention provides a profile providing apparatus, including:

a receiving module, configured to receive a data request message sent by a terminal; and an information sending module, configured to send, to the terminal, information about a user according to the data request message, so that the terminal establishes an operating system according to the information about the user.

With reference to the fifth aspect, in a first possible implementation manner of the fifth aspect, the receiving module is specifically configured to receive an operating system information request message sent by the terminal, where the operating system information request message includes identification ID of the user; and the information sending module is specifically configured to send, to the terminal, operating system information of the user according to the operating system information request message, where the operating system information of the user includes information about an operating system providing server.

With reference to the fifth aspect, in a second possible implementation manner of the fifth aspect, the receiving module is specifically configured to receive a profile request message sent by the terminal, where the profile request message includes ID of the user and information about an operating system providing server; and the information sending module is specifically configured to send, to the terminal, a profile of the user according to the profile request message, where the profile of the user includes personalized information of the operating system.

According to a sixth aspect, an embodiment of the present invention provides an operating system providing apparatus, including:

a receiving module, configured to receive an operating system request message sent by a terminal; and an operating system sending module, configured to send, to the terminal, an operating system copy according to the operating system request message, so that the terminal establishes an operating system according to the operating system copy.

According to a seventh aspect, an embodiment of the present invention provides a terminal, including:

a processor, configured to: start a just enough operating system, and enable a basic application service, where the just enough operating system includes a basic application service module, an operating system core library module, and an instruction translation module, where the operating system core library includes file storage, execution of supporting the basic application service, Internet access, and input/output, where the basic application service includes a call application, an SMS message application, a browser application, and an input method application; and an input device, configured to acquire a data selection instruction input by a user; where the processor is further configured to: determine a profile providing server according to the data selection instruction, and acquire operating system information from the profile providing server; and access an operating system providing server according to the operating system information, acquire an operating system copy, and deploy the operating system copy in an operating system container to establish an operating system, where the operating system container is used to run the operating system copy.

With reference to the seventh aspect, in a first possible implementation manner of the seventh aspect, the data selection instruction includes identification ID that is selected by the user and that is of the profile providing server and ID of the user; and the processor is specifically configured to: determine, according to the ID of the profile providing server, the profile providing server that provides a service; access, by addressing, the profile providing server according to the ID of the user; and acquire the operating system information from the profile providing server, where the operating system information includes information about the operating system providing server.

With reference to the seventh aspect or the first possible implementation manner of the seventh aspect, in a second possible implementation manner of the seventh aspect, the terminal further includes:

a transmitter, configured to send a profile request message to the profile providing server, where the profile request message includes the ID of the user and the information about the operating system providing server; where the processor is further configured to: acquire a profile of the user from the profile providing server, and complete personalized processing of the operating system according to the profile of the user.

With reference to the seventh aspect and either of the first to the second possible implementation manners of the seventh aspect, in a third possible implementation manner of the seventh aspect, the input device is further configured to acquire a data exchange function enabling instruction input by the user; and the processor is further configured to enable a data exchange service according to the data exchange function enabling instruction.

According to an eighth aspect, an embodiment of the present invention provides a profile providing server, including:

a receiver, configured to receive a data request message sent by a terminal; and a transmitter, configured to send, to the terminal, information about a user according to the data request message, so that the terminal establishes an operating system according to the information about the user.

With reference to the eighth aspect, in a first possible implementation manner of the eighth aspect, the receiver is specifically configured to receive an operating system information request message sent by the terminal, where the operating system information request message includes identification ID of the user; and the transmitter is specifically configured to send, to the terminal, operating system information of the user according to the operating system information request message, where the operating system information of the user includes information about an operating system providing server.

With reference to the eighth aspect, in a second possible implementation manner of the eighth aspect, the receiver is specifically configured to receive a profile request message sent by the terminal, where the profile request message includes ID of the user and information about an operating system providing server; and the transmitter is specifically configured to send, to the terminal, a profile of the user according to the profile request message, where the profile of the user includes personalized information of the operating system.

According to a ninth aspect, an embodiment of the present invention provides an operating system providing server, including:

a receiver, configured to receive an operating system request message sent by a terminal; and a processor, configured to send, to the terminal, an operating system copy according to the operating system request message, so that the terminal establishes an operating system according to the operating system copy.

According to the operating system establishing method and apparatus in the embodiments of the present invention, a just enough operating system is started in a terminal device, and hardware and an operating system that are of a terminal are decoupled, which achieves a purpose that a terminal may establish an operating system according to a user preference. In addition, multiple operating system copies do not need to be locally stored on the terminal, and a large amount of storage space is released, which resolves a problem in the prior art that a selection range of the operating system is limited and cannot be expanded.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

Figure 1:
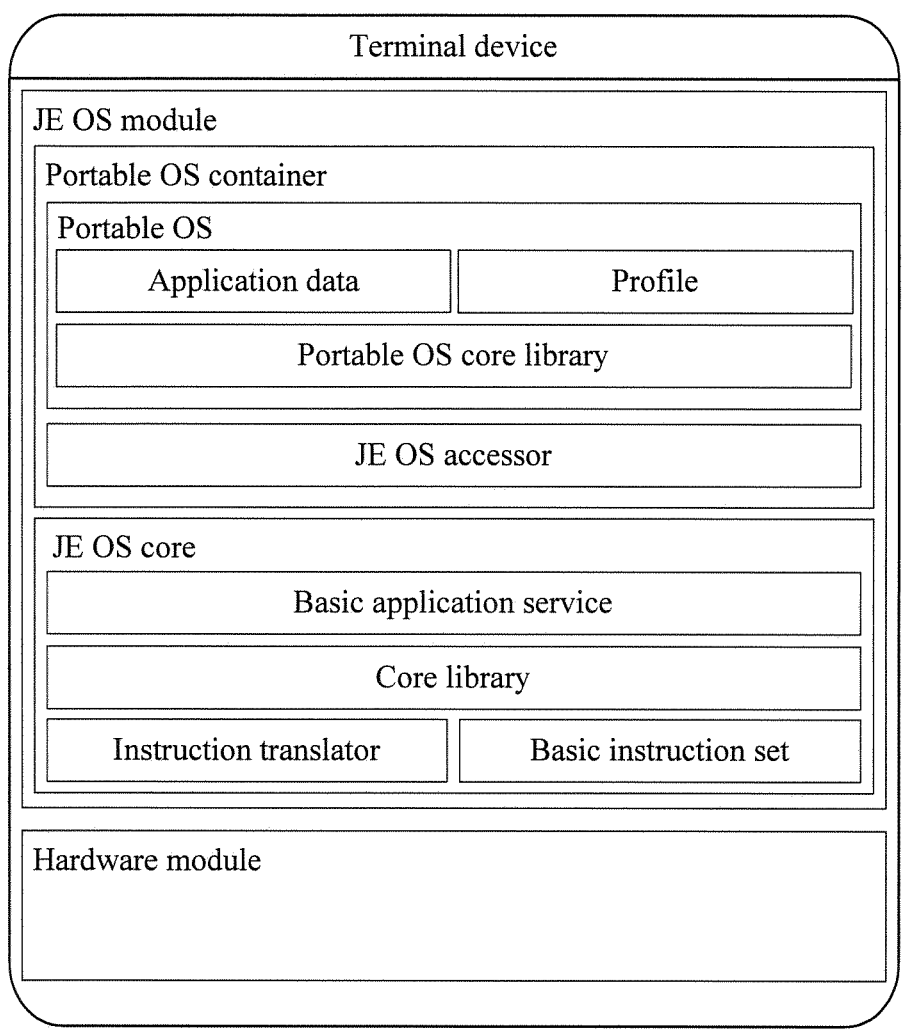
FIG. 1 is a schematic diagram of module division of a terminal device.

The present invention introduces a concept of a just enough operating system (Just Enough Operation System, JE OS for short) at a hardware layer of a terminal device, where the just enough operating system is located between hardware and a high-layer application that are of a terminal and is a bridge between hardware and software. In terms of logical division, the just enough operating system includes a basic application service module, an operating system core library module, and an instruction translation module. The operating system core library includes file storage, execution of supporting the basic application service, Internet access, and input/output. The basic application service includes a call application, an SMS message application, a browser application, and an input method application. A user may select, on the basis of the JE OS, an operating system providing server according to a profile (Profile) of the user, and decouples hardware and an operating system that are of the terminal device by using the JE OS. An initial terminal device has only a JE OS in addition to hardware, and the JE OS is used to provide a most basic network service and communication service that are necessary to the terminal device. The terminal device starts the JE OS, and meanwhile, enables the basic application service provided by the JE OS. In this case, the terminal device has only basic functions such as power-on, display, and input/output. FIG. 1 is a schematic diagram of module division of a terminal device. As shown in FIG. 1, the terminal device generally includes two modules, that is, a JE OS module and a hardware module, where the JE OS module includes a JE OS core and a portable operating system (Portable Operating System, Portable OS for short) container. The JE OS core includes a basic application service, a core library, an instruction translator, and a basic instruction set; the Portable OS container includes a JE OS accessor and a Portable OS. The Portable OS includes application data, a profile, and a Portable OS core library. The JE OS module accesses the hardware module by using the core library in the JE OS core. The JE OS module is a software module, and the Portable OS container included in the JE OS module is used to locally perform operations of storing and running an operating system on the terminal; the Portable OS is an operating system, where the operating system may be an operating system copy that is synchronized from an operating system providing server according to a profile of a user. The Portable OS core library is a core logic module of the operating system, the profile is personalized data that is synchronized from a profile providing server and may be used to perform personalized processing on the operating system, and the application data is various terminal applications that are directly faced with and are used by the user, for example, various applications (Application, APP for short) that can be installed on the terminal, where the APPs are related to a type of the operating system, for example, an APP supporting an android system and an APP supporting an iPhone mobile operating system. The JE OS accessor is middleware through which the hardware accesses the JE OS. The JE OS core is located at a layer higher than the hardware module of the terminal, where the core library is a logic software module of the JE OS core, obtains, in an upward manner, various instructions from the Portable OS container and executes the instructions, and accesses, in a downward manner, the hardware module of the terminal and controls the hardware. The core library includes various control modules, logic modules, file systems, input/output (Input/Output, I/O for short) device control, and the like that are necessary to the operating system of the terminal. The basic application service is an application that supports basic functions of the terminal, such as basic communication and network access, and that is directly faced with and is used by the user. The instruction translation module interacts with the Portable OS and is used to: after obtaining an instruction sent by the Portable OS, translate the instruction into an instruction that can be recognized by the JE OS, and hands over the translated instruction to the JE OS for processing. The basic instruction set includes all basic instructions that can be recognized by the JE OS.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 2:
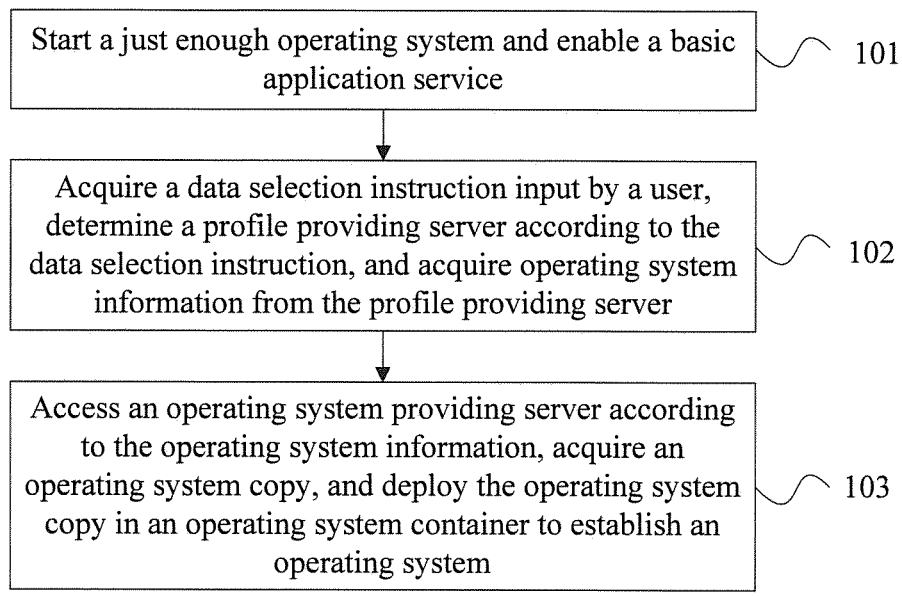
FIG. 2 is a flowchart of an operating system establishing method according to Embodiment 1 of the present invention.

FIG. 2 is a flowchart of an operating system establishing method according to Embodiment 1 of the present invention. As shown in FIG. 2, the method in this embodiment may include:

Step 101: Start a just enough operating system and enable a basic application service.

The just enough operating system includes a basic application service module, an operating system core library module, and an instruction translation module, where the operating system core library includes file storage, execution of supporting the basic application service, Internet access, and input/output, where the basic application service includes a call application, an SMS message application, a browser application, and an input method application. The just enough operating system is an initialized operating system of a terminal, and for example, may be the foregoing JE OS. The basic application service is an application that is in the initialized operating system and that is available for a user to use, and may be an application that supports basic functions of the terminal, such as basic communication and network access, and that is directly faced with and is used by the user. This embodiment may be executed by any terminal device, which, for example, may be a desktop, laptop, tablet, or handheld computer, or may be a cellular phone, a personal digital assistant (Personal Digital Assistant, PDA for short), a dedicated media player, a consumer electronic device, or the like, which is collectively referred to as a terminal device herein. The terminal device includes the modules shown in the FIG. 1.

Step 102: Acquire a data selection instruction input by a user, determine a profile providing server according to the data selection instruction, and acquire operating system information from the profile providing server.

In this embodiment, the user inputs the data selection instruction on the terminal. There may be multiple forms for this process. For example, this process may be that the user actively inputs an IP address or a domain name that is provided by the profile providing server and that is for data download, so as to input the data selection instruction to the terminal device; this process may also be that the user inputs a Chinese/English name of the profile providing server, and the terminal device obtains, by matching, from the Chinese/English name that is locally stored and that is of the profile providing server, the IP address or the domain name that is provided by the profile providing server and that is for data download; this process may further be that the terminal device presents, by using a display screen, data that may be input by the user to the user as default selection data on a drop-down list, and the user inputs the data selection instruction by selecting an option from the drop-down list. The user selects his/her profile service providing server by using an input/output module of the terminal, and then the data selection instruction is generated on the terminal. The profile service providing server herein may be a large-size server, a cloud computing platform, or the like that stores a profile of the user. The user may prestore some of his/her profiles on the server, for example, a record of operating system use history and a personal preference for an operating system. The terminal device may learn the profile providing server of the user according to the data selection instruction, where the data selection instruction may be a login instruction of the foregoing IP address or domain name, or may be a control instruction corresponding to each option of the foregoing drop-down list. The terminal device accesses the profile service providing server according to these instructions, then may acquire, from the profile providing server, operating system information of the user according to a login account input by the user, and locally synchronizes the operating system information.

Step 103: Access an operating system providing server according to the operating system information, acquire an operating system copy, and deploy the operating system copy in an operating system container to establish an operating system.

In this embodiment, after the terminal device acquires the operating system information of the user from the profile providing server, the operating system information may include information about a type and a version of the operating system that is preferred by the user and the like. The terminal device may obtain, by matching, from a locally stored address of an operating system providing server, an address of an operating system providing server corresponding to the type of the operating system that is preferred by the user. The operating system information may further directly include the address of the operating system providing server, and the terminal device directly accesses, by addressing, the operating system providing server according to the address. Then the terminal device may acquire the operating system copy from the operating system providing server, where the operating system copy may, for example, be a mobile phone system firmware (ROM) package. After locally synchronizing the operating system copy, the terminal device deploys the operating system copy in an operating system container, where the operating system container is used to run the operating system copy. The operating system container herein may be the foregoing Portable OS container, that is, a software module that is exclusively used to store and run the operating system on the terminal. In this case, the operating system preferred by the user is established in the terminal device. It should be noted that the operating system container is only a name of an apparatus or a module running the operating system copy in this embodiment of the present invention. All apparatuses or modules that can implement a function of running the operating system copy should fall into a protection scope of this embodiment of the present invention, which is not limited in this embodiment of the present invention.

It can be learned that the just enough operating system separates the hardware of the terminal from the operating system of the terminal, and the just enough operating system undertakes work of signaling interaction and translation between the hardware and the operating system. The hardware does not need to directly parse an instruction of the operating system, and the operating system does not need to passively implement the instruction of the operating system according to a function of the hardware either. As long as the just enough operating system is used as an intermediary, the terminal may establish any operating system on the basis of the hardware of the terminal. Optionally, when the terminal acquires the operating system copy of the user, there may be multiple choices, that is, the user may prefer multiple operating systems. In this case, the operating system providing server and the operating system copy may be determined by using a further selection of the user. In this way, the terminal does not need to locally store all operating system copies, which greatly saves storage space of the terminal itself.

In this embodiment, a just enough operating system is started in a terminal device, and hardware and an operating system that are of a terminal are decoupled, which achieves a purpose that the terminal may establish an operating system according to a user preference. In addition, multiple operating system copies do not need to be locally stored on the terminal, and a large amount of storage space is released, which resolves a problem in the prior art that a selection range of the operating system is limited and cannot be expanded.

Further, the data selection instruction includes identification ID that is selected by the user and that is of the profile providing server and ID of the user. In the foregoing method embodiment, a specific implementation method of step 102 of acquiring a data selection instruction input by a user, determining a profile providing server according to the data selection instruction, and acquiring operating system information from the profile providing server may be: acquiring the data selection instruction input by the user; determining, according to the ID of the profile providing server, the profile providing server that provides a service; accessing, by addressing, the profile providing server according to the ID of the user; and acquiring the operating system information from the profile providing server, where the operating system information includes information about the operating system providing server.

Specifically, after the user selects his/her profile service providing server by using the input/output module of the terminal, the terminal device receives the data selection instruction formed by the foregoing operation, where the instruction may include the identification (Identification, ID for short) that is selected by the user and that is of the profile providing server, and may further include an identity ID input by the user. The terminal device determines, according to the ID of the profile providing server, a server to which login needs to be performed, and then accesses, by addressing, by using the ID of the user, operating system information that is stored on the profile providing server and that is related to the user, where the operating system information may include information about a providing server of the operating system preferred by the user.

Figure 3:
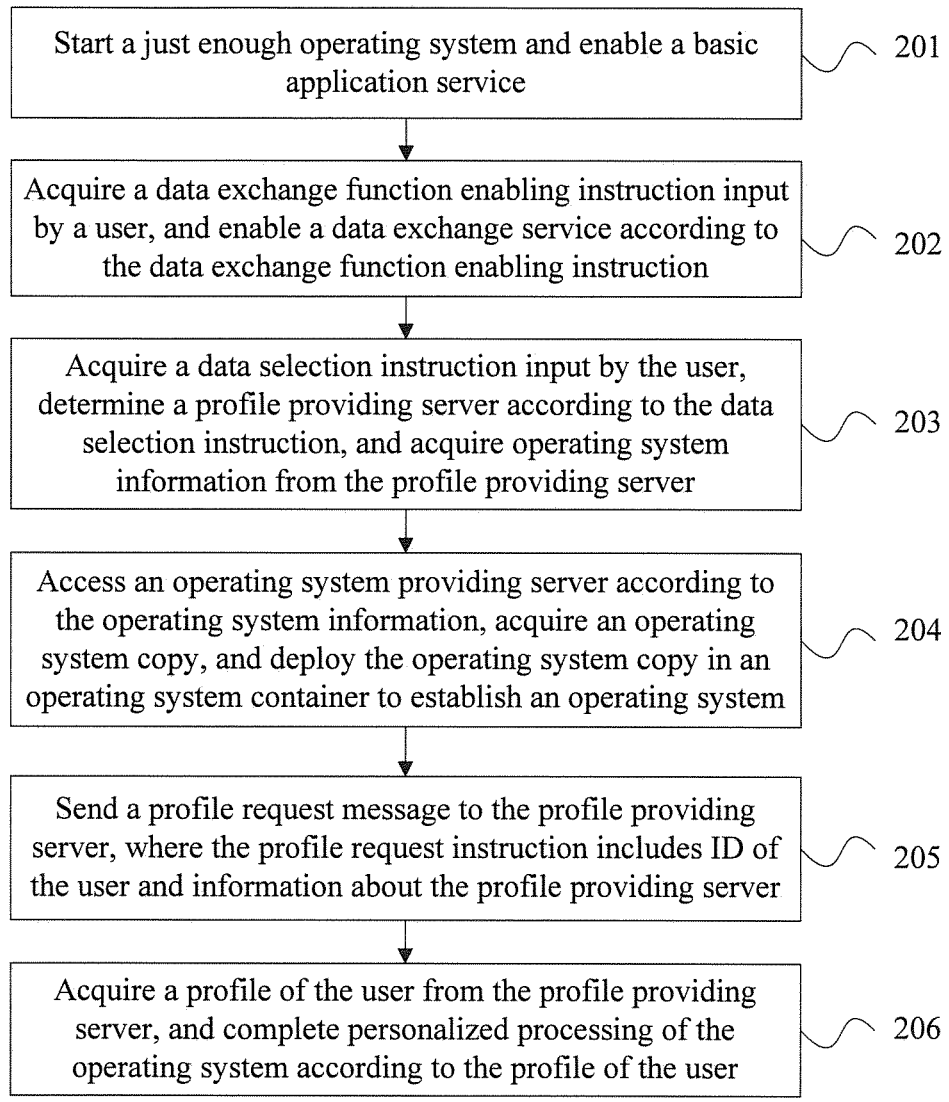
FIG. 3 is a flowchart of an operating system establishing method according to Embodiment 2 of the present invention.

FIG. 3 is a flowchart of an operating system establishing method according to Embodiment 2 of the present invention. As shown in FIG. 3, the method in this embodiment may include:

Step 201: Start a just enough operating system and enable a basic application service.

This embodiment may be executed by any terminal device. In this embodiment, a process of starting a just enough operating system and enabling a basic application service is similar to step 101 in the foregoing method embodiment, which is not described herein again.

Step 202: Acquire a data exchange function enabling instruction input by a user, and enable a data exchange service according to the data exchange function enabling instruction.

In this embodiment, after a terminal device starts the basic application service, a terminal may implement basic services such as display and input and output. In this case, to complete data exchange with an external server, a user chooses to start a data exchange function of the terminal, and the terminal device receives a data exchange function enabling instruction. According to the instruction, the just enough operating system of the terminal device may dispatch a hardware module by using the foregoing core library, and enable a data exchange module in hardware. For example, the data exchange module may be a network module, a Bluetooth module, or an infrared module of the terminal.

Step 203: Acquire a data selection instruction input by the user, determine a profile providing server according to the data selection instruction, and acquire operating system information from the profile providing server.

In this embodiment, a process of acquiring a data selection instruction input by the user, determining a profile providing server according to the data selection instruction, and acquiring operating system information from the profile providing server is similar to step 102 in the foregoing method embodiment, which is not described herein again.

Step 204: Access an operating system providing server according to the operating system information, acquire an operating system copy, and deploy the operating system copy in an operating system container to establish an operating system.

In this embodiment, a process of accessing an operating system providing server according to the operating system information, acquiring an operating system copy, and deploying the operating system copy in an operating system container to establish an operating system is similar to step 103 in the foregoing method embodiment, which is not described herein again.

Step 205: Send a profile request message to the profile providing server, where the profile request instruction includes ID of the user and information about the profile providing server.

In this embodiment, after the terminal device establishes the operating system, the terminal device may further perform personalized processing on the operating system. The terminal device sends the profile request message to the profile providing server. This process may be that after deployed, the operating system of the terminal device voluntarily initiates personalized processing of the operating system, that is, after receiving a profile request instruction sent by a Portable OS container, a JE OS accessor of the terminal device first translates the instruction by using a translation instruction in a basic instruction set, and then executes the instruction by using a core library, that is, sends the profile request message to the profile providing server.

Optionally, this process may also be a process in which the user inputs a personalized processing instruction to trigger the personalized processing of the operating system. For example, the user inputs, on the terminal, an instruction for downloading an address book, a call record, and the like, and the terminal device sends the profile request message to the profile providing server according to the instruction.

Step 206: Acquire a profile of the user from the profile providing server, and complete personalized processing of the operating system according to the profile of the user.

In this embodiment, more profiles of the user that are acquired by the terminal device from the profile providing server may be an address book, a call record, an SMS message, and the like that are backed up by the user, and may further be an APP and beautification information of the operating system that are backed up in advance. The profile here may be information that is of any user and that is related to the operating system, which is not specifically limited herein. The terminal device performs personalized processing on the operating system according to the profile of the user. For example, the address book, the call record, the SMS message, and the like that are backed up by the user are respectively stored in an address book, a call record, and an SMS message that are of the terminal device, the APP that is backed up by the user in advance is installed on the terminal device, and a theme, wallpaper, and the like that are of the terminal device are installed according to the beautification information of the operating system. In this way, the operating system of the terminal device includes an address book, a previous call record, and an SMS message that are of the user, software and a game that the user prefers to use, and a color, a theme, and the like that are of the operating system preferred by the user. Therefore, customization of a personal operating system of the user is completely implemented.

In this embodiment, a just enough operating system is started in a terminal device, and hardware and an operating system that are of a terminal are decoupled, which achieves a purpose that a terminal may establish an operating system according to a user preference and implements personalized processing of the operating system, implementing customization of an operating system of a user, and resolving a problem in the prior art that a selection range of the operating system is limited and cannot be expanded.

Figure 4:
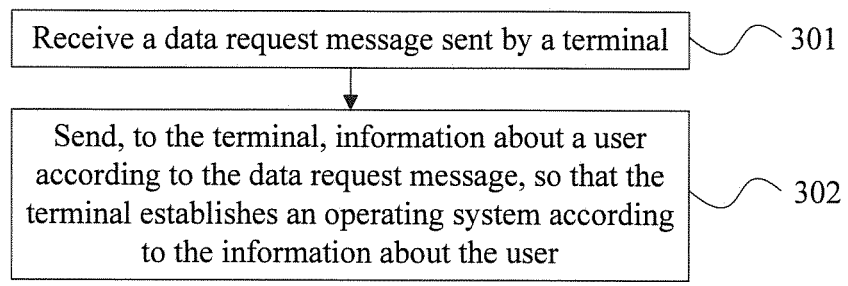
FIG. 4 is a flowchart of an operating system establishing method according to Embodiment 3 of the present invention.

FIG. 4 is a flowchart of an operating system establishing method according to Embodiment 3 of the present invention. As shown in FIG. 4, the method in this embodiment may include:

Step 301: Receive a data request message sent by a terminal.

This embodiment may be executed by a profile providing server. The profile server may be a large server, a cloud computing platform, or the like that is provided by an operator or an equipment vendor and is configured to provide a cloud storage medium for a user. The user may have personal information storage space by registering an account, which may store operating system preference setting information of the user, and information of the user about an address book, a call record, a beautification theme of an operating system, and the like. The profile server receives the data request message sent by the terminal, so as to provide related information to the terminal.

Step 302: Send, to the terminal, information about a user according to the data request message, so that the terminal establishes an operating system according to the information about the user.

In this embodiment, a profile server returns corresponding information about the user according to the data request message, where the information may be reference information used to provide a preference of the user for an operating system, may also be private record information of the user, or may further be historical data of the user. Those pieces of data may all enable the terminal to locally establish the operating system.

In this embodiment, the information about the user is provided for the terminal device, so that the terminal establishes the operating system, which implements that the information about the user is stored outside the terminal, a large amount of storage space is saved for the terminal, and security of the information about the user is ensured in a manner of personal account login of the user.

Further, in the foregoing method embodiment, a specific implementation method of step 301 of receiving a data request message sent by a terminal may be: receiving an operating system information request message sent by the terminal, where the operating system information request message includes identification ID of the user; and in the foregoing method embodiment, a specific implementation method of step 302 of sending, to the terminal, information about a user according to the data request message may be: sending, to the terminal, operating system information of the user according to the operating system information request message, where the operating system information of the user includes information about an operating system providing server.

Specifically, the profile server receives the operating system information request message sent by the terminal, and the terminal logs in to the profile server by using the ID of the user. Therefore, the profile server returns, to the terminal, operating system information stored at the ID of the user, where the operating system information is the information about the operating system providing server.

Further, in the foregoing method embodiment, a specific implementation method of step 301 of receiving a data request message sent by a terminal may be: receiving a profile request message sent by the terminal, where the profile request message includes the ID of the user and the information about the operating system providing server; and in the foregoing method embodiment, a specific implementation method of step 302 of sending, to the terminal, information about a user according to the data request message may be: sending a profile of the user to the terminal according to the profile request message, where the profile of the user includes personalized information of the operating system.

Specifically, the profile server receives the profile request message sent by the terminal, and the terminal logs in to the profile server by using the ID of the user. Therefore, the profile server returns, to the terminal, an acquired profile of the user that corresponds to the ID of the user and that is related to the information about the operating system providing server. The profile of the user here may include personalized information of all operating systems, for example, an address book, a call record, an SMS message, wallpaper, and an APP of the user.

Figure 5:
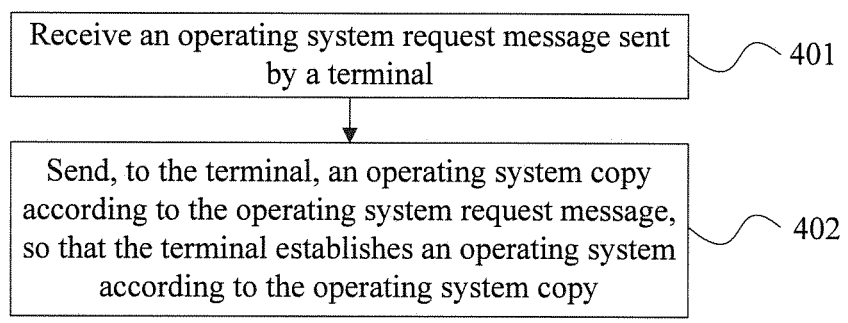
FIG. 5 is a flowchart of an operating system establishing method according to Embodiment 4 of the present invention.
Figure 6A:
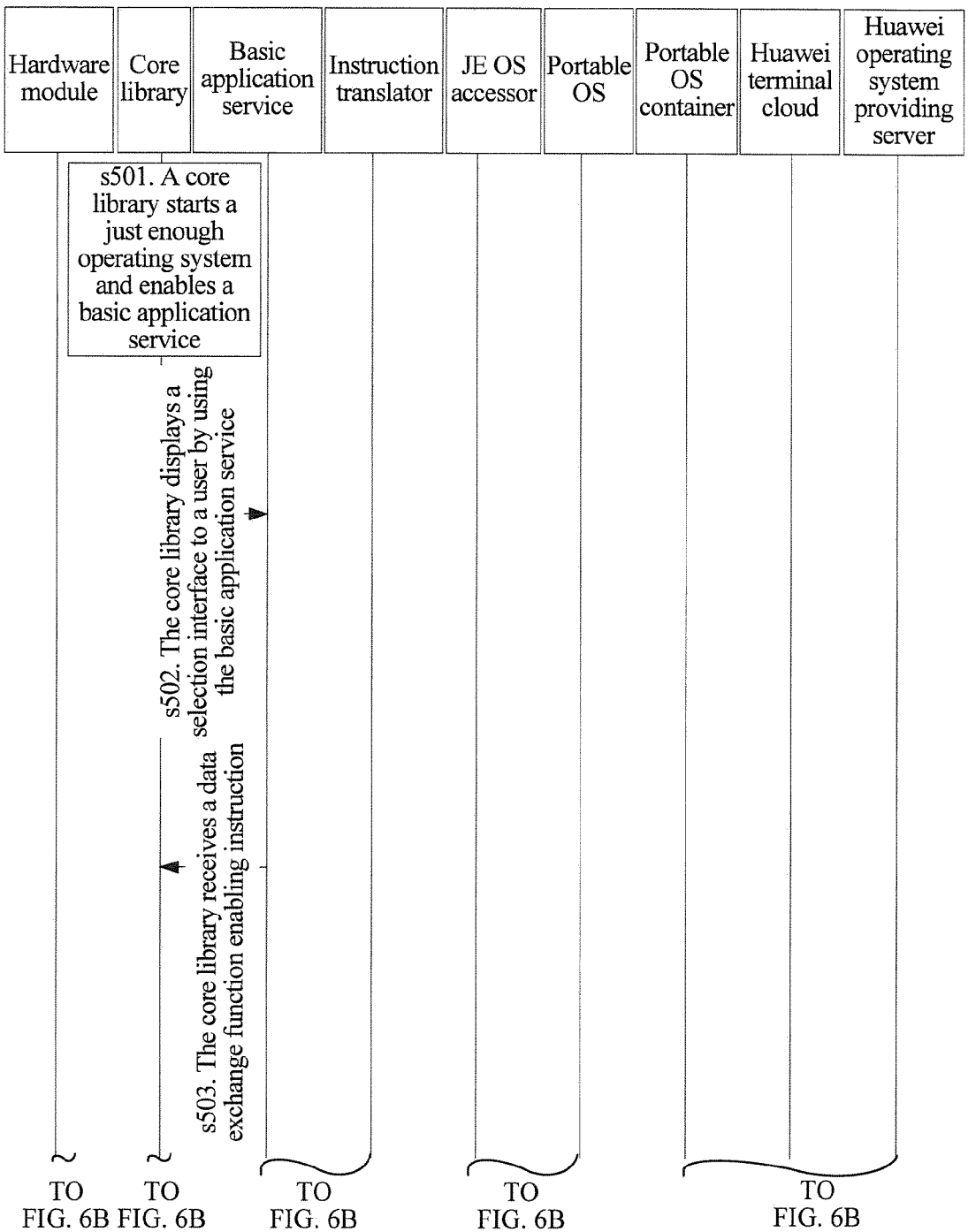
FIG. 6A, FIG. 6B, FIG. 6C, and FIG. 6D are a flowchart of an operating system establishing method according to Embodiment 5 of the present invention.
Figure 6B:
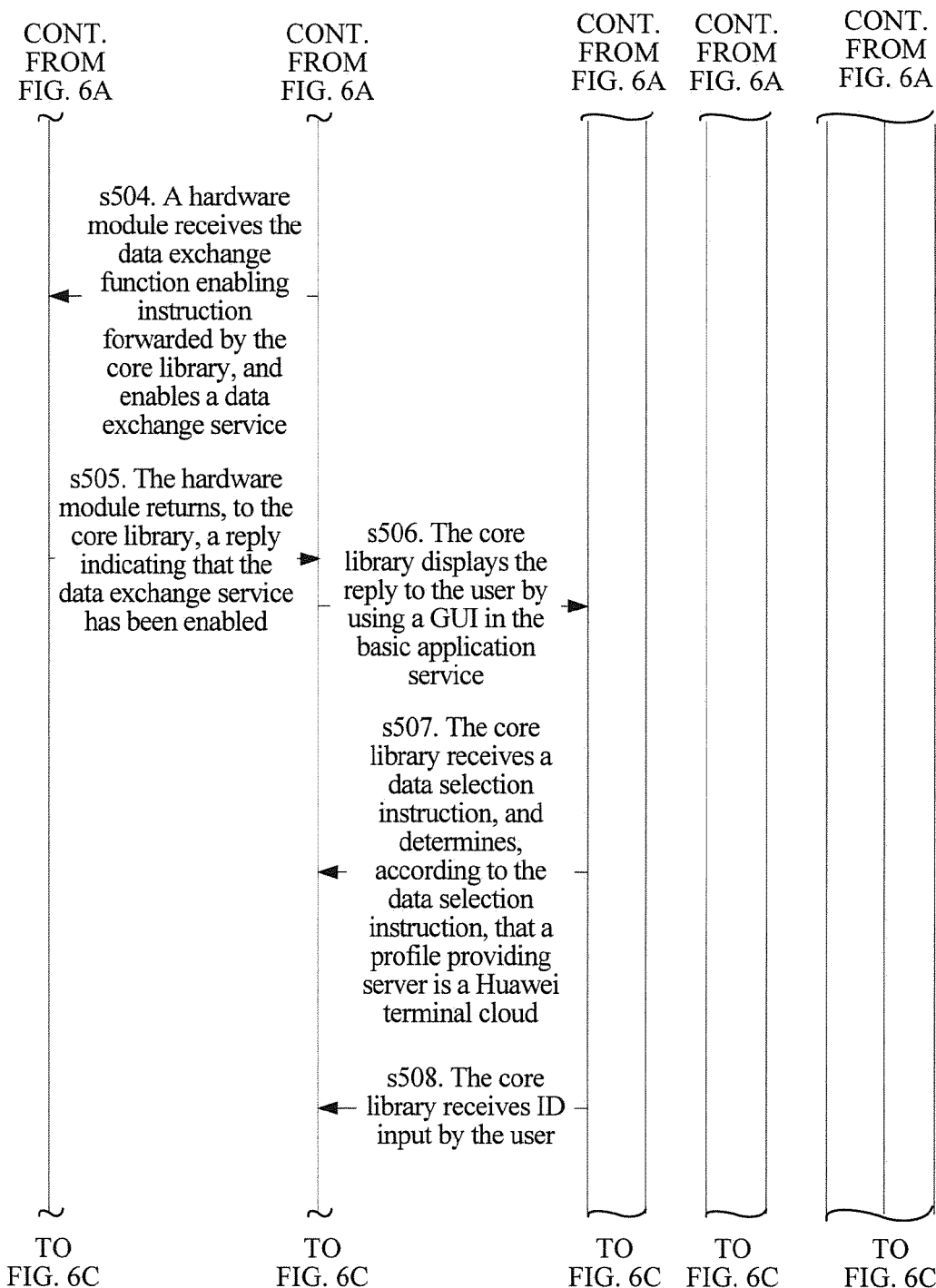
Figure 6C:
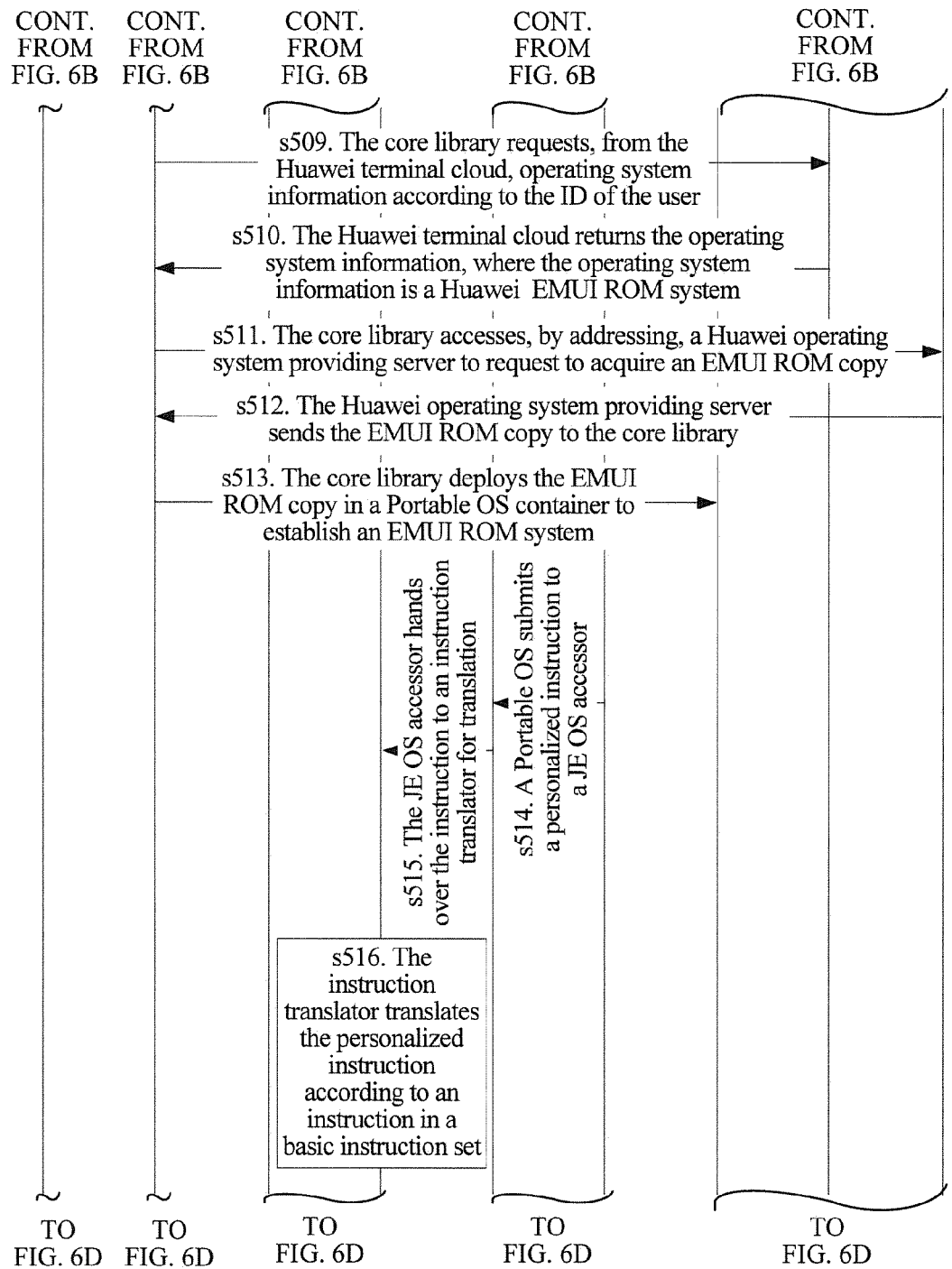
Figure 6D:
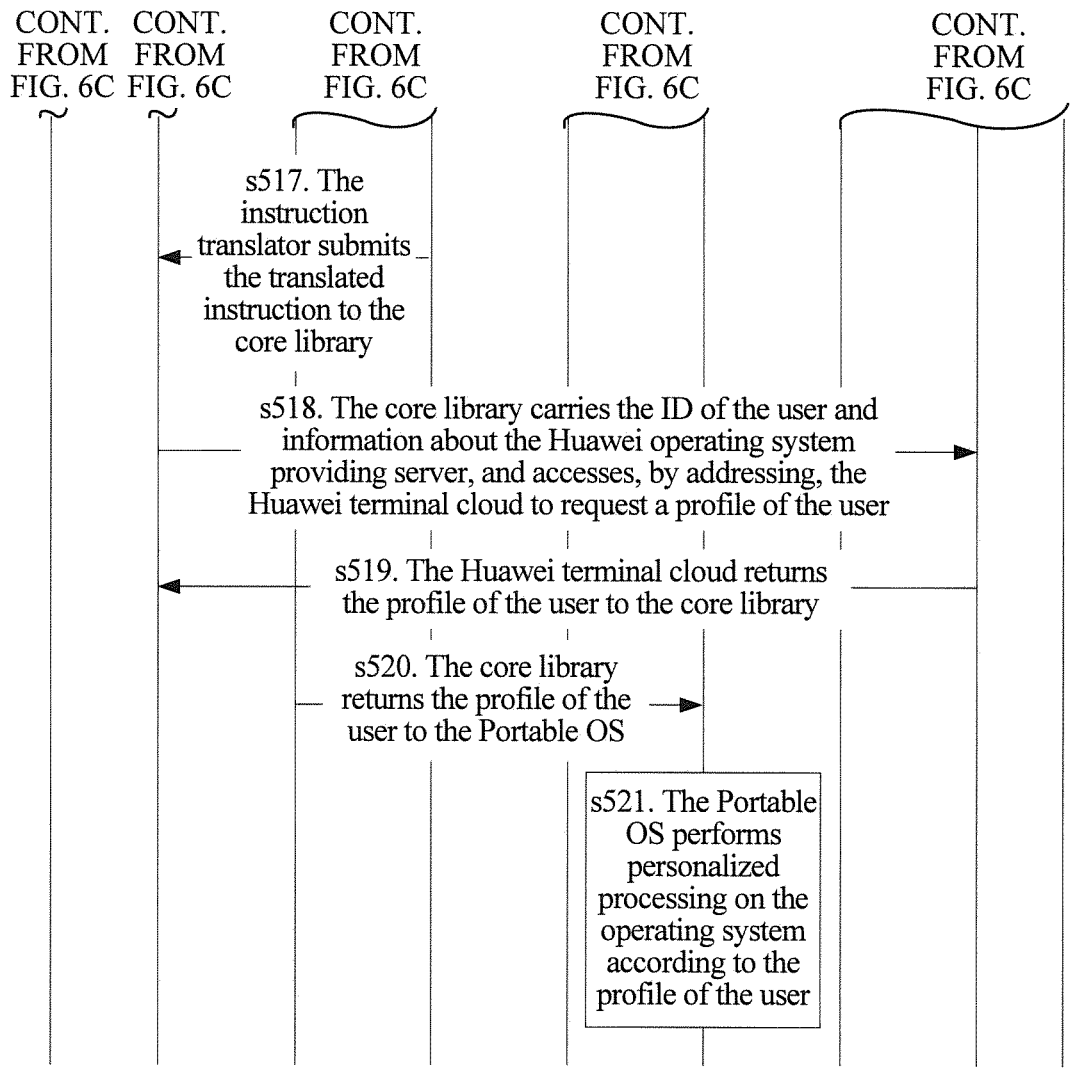

FIG. 5 is a flowchart of an operating system establishing method according to Embodiment 4 of the present invention. As shown in FIG. 5, the method in this embodiment may include:

Step 401: Receive an operating system request message sent by a terminal.

This embodiment may be executed by an operating system providing server.

Step 402. Send, to the terminal, an operating system copy according to the operating system request message, so that the terminal establishes an operating system according to the operating system copy.

In this embodiment, the operating system providing server learns, according to the operating system request message sent by the terminal, an operating system copy that the terminal wants to acquire, that is, the operating system copy is locally sent to the terminal.

In this embodiment, an operating system copy is provided for a terminal device, so that a terminal establishes an operating system, which implements that a large quantity of operating system copies are stored outside the terminal, and a large amount of storage space is saved for the terminal.

The following describes the technical solutions of the method embodiments shown in FIG. 2 to FIG. 5 in detail by using several specific embodiments.

FIG. 6A, FIG. 6B, FIG. 6C, and FIG. 6D are a flowchart of an operating system establishing method according to Embodiment 5 of the present invention. As shown in FIG. 6A, FIG. 6B, FIG. 6C, and FIG. 6D, the method in this embodiment may include: a procedure in which a terminal establishes an operating system is described in detail according to the module division method of a terminal device shown in FIG. 1 in this embodiment.

S501. A core library starts a just enough operating system and enables a basic application service.

S502. The core library displays a selection interface to a user by using the basic application service.

In this embodiment, the basic application service includes a graphic user interface (Graphical User Interface, GUI for short). An operating system and an application service that are of a terminal may be displayed to the user by using the GUI, a selection interface that interacts with the user may also be displayed to the user by using the GUI, and the user may perform selection and determining in the GUI. An input and output module here may be a touchscreen of the terminal and receives an instruction of the user by means of a tapping operation of the user.

S503. The core library receives a data exchange function enabling instruction.

In this embodiment, the user inputs the data exchange function enabling instruction by tapping the touchscreen, where the data exchange function enabling instruction may be input when the user taps a data exchange function enabling key in the GUI.

S504. A hardware module receives the data exchange function enabling instruction forwarded by the core library, and enables a data exchange service.

S505. The hardware module returns, to the core library, a reply indicating that the data exchange service has been enabled.

S506. The core library displays the reply to the user by using a GUI in the basic application service.

In this embodiment, a result of enabling hardware related to a data exchange function may be displayed to the user by using the GUI.

S507. The core library receives a data selection instruction, and determines, according to the data selection instruction, that a profile providing server is a Huawei terminal cloud.

In this embodiment, the user inputs the data selection instruction by using the GUI, and a specific method is similar to step 102 in the foregoing method embodiment, which is not described herein again. The user stores personal information on the Huawei terminal cloud. Therefore, a key that the user taps in the GUI interface is a related key of the Huawei terminal cloud.

S508. The core library receives ID input by the user.

S509. The core library requests, from the Huawei terminal cloud, operating system information according to the ID of the user.

In this embodiment, the core library logs in to the Huawei terminal cloud by using the ID of the user, and acquires operating system information corresponding to the ID of the user.

S510. The Huawei terminal cloud returns the operating system information, where the operating system information is a Huawei emotion user interface (Emotion User Interface, EMUI for short) mobile phone system firmware (ROM) system.

In this embodiment, the operating system information of the user stored in the Huawei terminal cloud is the Huawei EMUI ROM system.

S511. The core library accesses, by addressing, a Huawei operating system providing server to request to acquire an EMUI ROM copy.

S512. The Huawei operating system providing server sends the EMUI ROM copy to the core library.

S513. The core library deploys the EMUI ROM copy in a Portable OS container to establish an EMUI ROM system.

S514. A Portable OS submits a personalized instruction to a JE OS accessor.

S515. The JE OS accessor hands over the instruction to an instruction translator for translation.

S516. The instruction translator translates the personalized instruction according to an instruction in a basic instruction set.

S517. The instruction translator submits the translated instruction to the core library.

S518. The core library carries the ID of the user and information about the Huawei operating system providing server, and accesses, by addressing, the Huawei terminal cloud to request a profile of the user.

S519. The Huawei terminal cloud returns the profile of the user to the core library.

S520. The core library returns the profile of the user to the Portable OS.

S521. The Portable OS performs personalized processing on the operating system according to the profile of the user.

In this case, a customized operating system is established on a terminal device of a user, where the operating system is preferred by the user, and personal information of the user is also reserved on the operating system, including an address book, a theme interface, an APP, and the like. These pieces of info/Elation provide a server request for a profile providing server and an operating system only when required. Only currently used information is locally reserved on a terminal, which saves storage space of the terminal. More importantly, the operating system on the terminal is not limited by hardware, which expands a selection range and significantly meets a requirement of the user for a personalized operating system.

Figure 7:
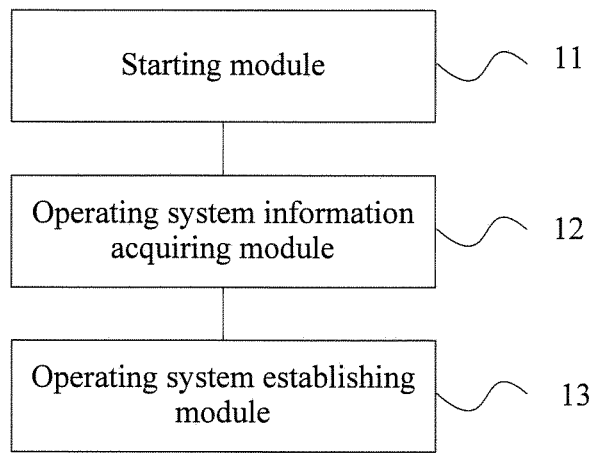
FIG. 7 is a schematic structural diagram of an operating system establishing apparatus according to Embodiment 1 of the present invention.

FIG. 7 is a schematic structural diagram of an operating system establishing apparatus according to Embodiment 1 of the present invention. As shown in FIG. 7, the apparatus in this embodiment may include: a starting module 11, an operating system information acquiring module 12, and an operating system establishing module 13, where the starting module 11 is configured to: start a just enough operating system and enable a basic application service, where the just enough operating system is an initialized operating system of a terminal, and the basic application service is an application that is in the initialized operating system and that is available for a user to use; the operating system information acquiring module 12 is configured to: acquire a data selection instruction input by a user, determine a profile providing server according to the data selection instruction, and acquire operating system information from the profile providing server; and the operating system establishing module 13 is configured to: access an operating system providing server according to the operating system information, acquire an operating system copy, and deploy the operating system copy in an operating system container to establish an operating system, where the operating system container is used to run the operating system copy.

The apparatus in this embodiment may be used to execute the technical solution in the method embodiment shown in FIG. 2, and implementation principles and technical effects of the apparatus are similar and are not described herein again.

Further, the data selection instruction includes identification ID that is selected by the user and that is of the profile providing server and ID of the user. The foregoing operating system information acquiring module 12 is specifically configured to: acquire the data selection instruction input by the user; determine, according to the ID of the profile providing server, the profile providing server that provides a service; access, by addressing, the profile providing server according to the ID of the user; and acquire the operating system information from the profile providing server, where the operating system information includes information about the operating system providing server.

Figure 8:
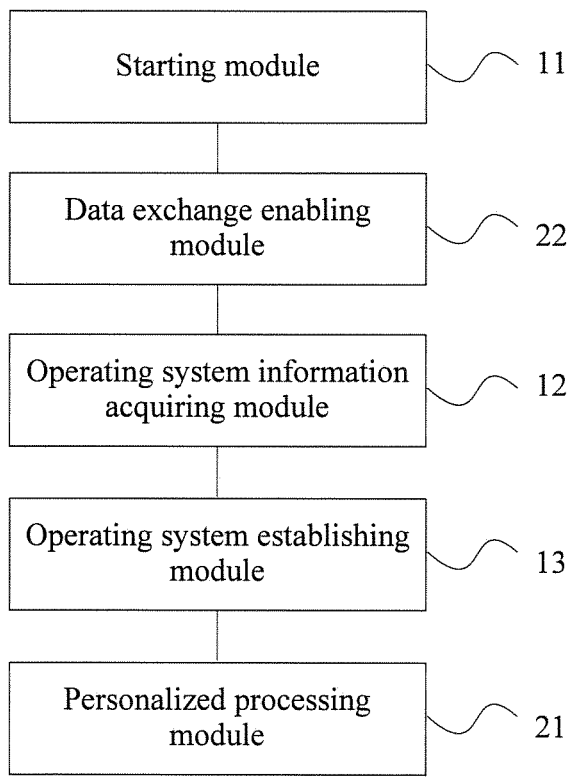
FIG. 8 is a schematic structural diagram of an operating system establishing apparatus according to Embodiment 2 of the present invention.

FIG. 8 is a schematic structural diagram of an operating system establishing apparatus according to Embodiment 2 of the present invention. As shown in FIG. 8, on the basis of a structure of the apparatus shown in FIG. 7, and further, the apparatus in this embodiment may further include: a personalized processing module 21 and a data exchange enabling module 22.

The personalized processing module 21 is configured to: send a profile request message to the profile providing server, acquire a profile of the user from the profile providing server, and complete personalized processing of the operating system according to the profile of the user, where the profile request message includes the ID of the user and the information about the operating system providing server.

The data exchange enabling module 22 is configured to: acquire a data exchange function enabling instruction input by the user, and enable a data exchange service according to the data exchange function enabling instruction.

The apparatus in this embodiment may be used to execute the technical solutions in the method embodiments shown in FIG. 2, FIG. 3, and FIG. 6A, FIG. 6B, FIG. 6C, and FIG. 6D, and implementation principles and technical effects of the apparatus are similar and are not described herein again.

Figure 9:
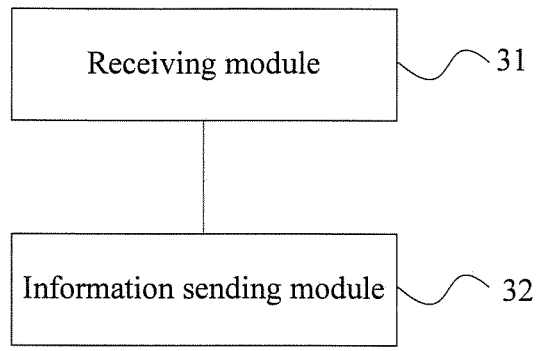
FIG. 9 is a schematic structural diagram of a profile providing apparatus according to an embodiment of the present invention.

FIG. 9 is a schematic structural diagram of a profile providing apparatus according to an embodiment of the present invention. As shown in FIG. 9, the apparatus in this embodiment may include: a receiving module 31 and an information sending module 32, where the receiving module 31 is configured to receive a data request message sent by a terminal; and the information sending module 32 is configured to: send, to the terminal, information about a user according to the data request message, so that the terminal establishes an operating system according to the information about the user.

The apparatus in this embodiment may be used to execute the technical solution in the method embodiment shown in FIG. 4 or FIG. 6A, FIG. 6B, FIG. 6C, and FIG. 6D, and implementation principles and technical effects of the apparatus are similar and are not described herein again.

Further, the foregoing receiving module 31 is specifically configured to receive an operating system information request message sent by the terminal, where the operating system information request message includes identification ID of the user; and the information sending module 32 is specifically configured to send, to the terminal, operating system information of the user according to the operating system information request message, where the operating system information of the user includes information about an operating system providing server.

Further, the foregoing receiving module 31 is specifically configured to receive a profile request message sent by the terminal, where the profile request message includes ID of the user and information about an operating system providing server; and the information sending module 32 is specifically configured to send, to the terminal, a profile of the user according to the profile request message, where the profile of the user includes personalized information of the operating system.

Figure 10:
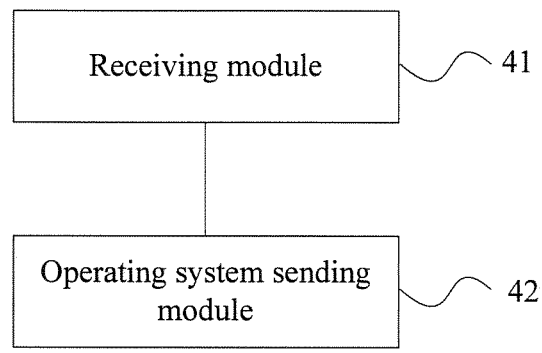
FIG. 10 is a schematic structural diagram of an operating system providing apparatus according to an embodiment of the present invention.

FIG. 10 is a schematic structural diagram of an operating system providing apparatus according to an embodiment of the present invention. As shown in FIG. 10, the apparatus in this embodiment may include: a receiving module 41 and an operating system sending module 42, where the receiving module 41 is configured to receive an operating system request message sent by a terminal; and the operating system sending module 42 is configured to: send, to the terminal, an operating system copy according to the operating system request message, so that the terminal establishes an operating system according to the operating system copy.

The apparatus in this embodiment may be used to execute the technical solution in the method embodiment shown in FIG. 5 or FIG. 6A, FIG. 6B, FIG. 6C, and FIG. 6D, and implementation principles and technical effects of the apparatus are similar and are not described herein again.

Figure 11:
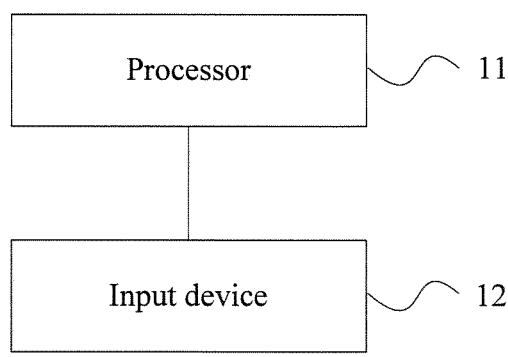
FIG. 11 is a schematic structural diagram of a terminal according to Embodiment 1 of the present invention.

FIG. 11 is a schematic structural diagram of a terminal according to Embodiment 1 of the present invention. As shown in FIG. 11, the device in this embodiment may include: a processor 11 and an input device 12, where the processor 11 is configured to: start a just enough operating system and enable a basic application service, where the just enough operating system is an initialized operating system of a terminal, and the basic application service is an application that is in the initialized operating system and that is available for a user to use; the input device 12 is configured to acquire a data selection instruction input by a user; and the processor 11 is further configured to: determine a profile providing server according to the data selection instruction, and acquire operating system information from the profile providing server; and access an operating system providing server according to the operating system information, acquire an operating system copy, and deploy the operating system copy in an operating system container to establish an operating system, where the operating system container is used to run the operating system copy.

The apparatus in this embodiment may be used to execute the technical solutions in the method embodiments shown in FIG. 2, FIG. 3, and FIG. 6A, FIG. 6B, FIG. 6C, and FIG. 6D, and implementation principles and technical effects of the apparatus are similar and are not described herein again.

Further, the data selection instruction includes identification ID that is selected by the user and that is of the profile providing server and ID of the user; and the processor 11 is specifically configured to: determine, according to the ID of the profile providing server, the profile providing server that provides a service; access, by addressing, the profile providing server according to the ID of the user; and acquire the operating system information from the profile providing server, where the operating system information includes information about the operating system providing server.

Figure 12:
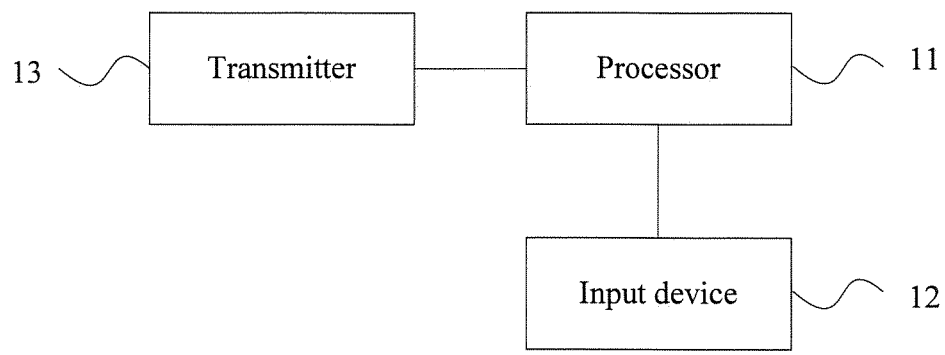
FIG. 12 is a schematic structural diagram of a terminal according to Embodiment 2 of the present invention.

FIG. 12 is a schematic structural diagram of a terminal according to Embodiment 2 of the present invention. As shown in FIG. 12, on the basis of a structure of the device shown in FIG. 11, and further, the device in this embodiment may further include: a transmitter 13, configured to send a profile request message to the profile providing server, where the profile request message includes the ID of the user and the information about the operating system providing server; and the foregoing processor 11 is further configured to: acquire a profile of the user from the profile providing server, and complete personalized processing of the operating system according to the profile of the user.

Further, the input device 12 is further configured to acquire a data exchange function enabling instruction input by the user; and the processor 11 is further configured to enable a data exchange service according to the data exchange function enabling instruction.

Figure 13:
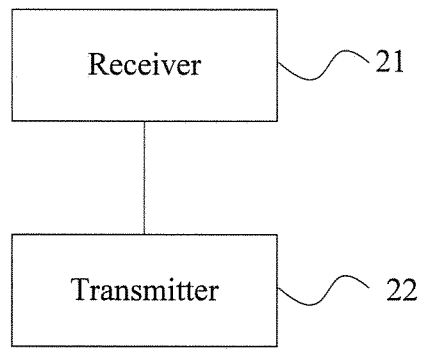
FIG. 13 is a schematic structural diagram of a profile providing server according to an embodiment of the present invention.

FIG. 13 is a schematic structural diagram of a profile providing server according to an embodiment of the present invention. As shown in FIG. 13, the device in this embodiment may include: a receiver 21 and a transmitter 22, where the receiver 21 is configured to receive a data request message sent by a terminal; and the transmitter 22 is configured to: send, to the terminal, information about a user according to the data request message, so that the terminal establishes an operating system according to the information about the user.

The apparatus in this embodiment may be used to execute the technical solution in the method embodiment shown in FIG. 4 or FIG. 6A, FIG. 6B, FIG. 6C, and FIG. 6D, and implementation principles and technical effects of the apparatus are similar and are not described herein again.

Further, the receiver 21 is specifically configured to receive an operating system information request message sent by the terminal, where the operating system information request message includes identification ID of the user; and the transmitter 22 is specifically configured to send, to the terminal, operating system information of the user according to the operating system information request message, where the operating system information of the user includes information about an operating system providing server.

Further, the receiver 21 is specifically configured to receive a profile request message sent by the terminal, where the profile request message includes ID of the user and information about an operating system providing server; and the transmitter 22 is specifically configured to send, to the terminal, a profile of the user according to the profile request message, where the profile of the user includes personalized information of the operating system.

Figure 14:
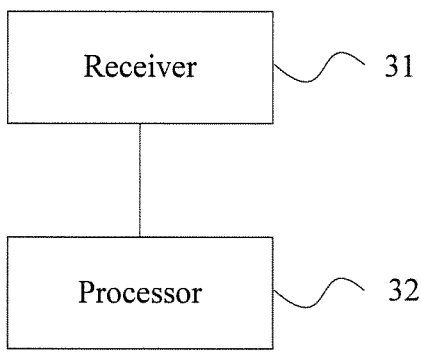
FIG. 14 is a schematic structural diagram of an operating system providing server according to an embodiment of the present invention.

FIG. 14 is a schematic structural diagram of an operating system providing server according to an embodiment of the present invention. As shown in FIG. 14, the device in this embodiment may include: a receiver 31 and a processor 32, where the receiver 31 is configured to receive an operating system request message sent by a terminal; and the processor 32 is configured to: send, to the terminal, an operating system copy according to the operating system request message, so that the terminal establishes an operating system according to the operating system copy.

The apparatus in this embodiment may be used to execute the technical solution in the method embodiment shown in FIG. 5 or FIG. 6A, FIG. 6B, FIG. 6C, and FIG. 6D, and implementation principles and technical effects of the apparatus are similar and are not described herein again.

Figure 15:
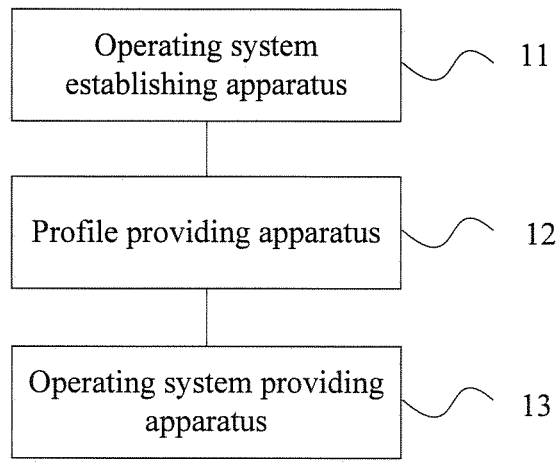
FIG. 15 is a schematic structural diagram of a communications system according to Embodiment 1 of the present invention.

FIG. 15 is a schematic structural diagram of a communications system according to Embodiment 1 of the present invention. As shown in FIG. 15, the system in this embodiment includes: an operating system establishing apparatus 11, a profile providing apparatus 12, and an operating system providing apparatus 13, where the operating system establishing apparatus 11 may use a structure of the apparatus embodiment shown in FIG. 7 or FIG. 8, and correspondingly, the operating system establishing apparatus 11 may execute the technical solution in any one of the method embodiments in FIG. 2 to FIG. 3, and FIG. 6A, FIG. 6B, FIG. 6C, and FIG. 6D, and implementation principles and technical effects of the apparatus are similar and are not described herein again; the profile providing apparatus 12 may use a structure of the apparatus embodiment shown in FIG. 9, and correspondingly, the profile providing apparatus 12 may execute the technical solution in the method embodiment shown in FIG. 4 or FIG. 6A, FIG. 6B, FIG. 6C, and FIG. 6D, and implementation principles and technical effects of the apparatus are similar and are not described herein again; and the operating system providing apparatus 13 may use a structure of the apparatus embodiment shown in FIG. 10, and correspondingly, the operating system providing apparatus 13 may execute the technical solution in the method embodiment shown in FIG. 5 or FIG. 6A, FIG. 6B, FIG. 6C, and FIG. 6D, and implementation principles and technical effects of the apparatus are similar and are not described herein again.

Figure 16:
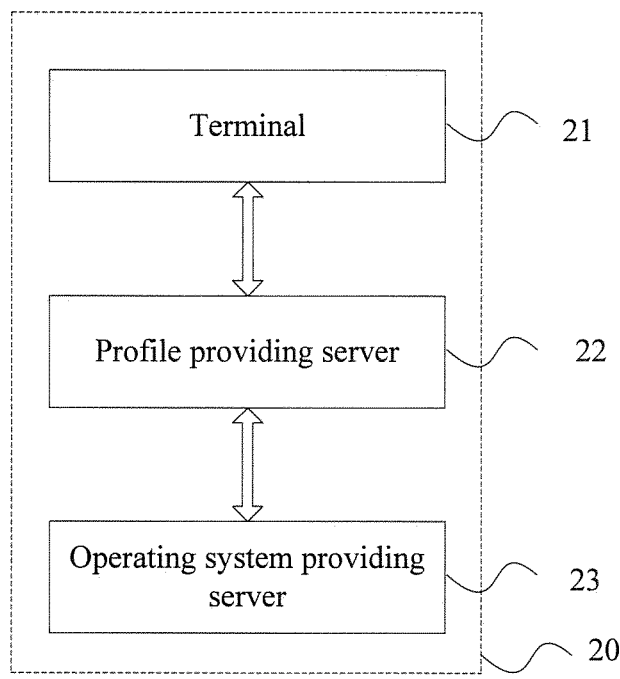
FIG. 16 is a schematic structural diagram of a communications system according to Embodiment 2 of the present invention.

FIG. 16 is a schematic structural diagram of a communications system according to Embodiment 2 of the present invention. As shown in FIG. 16, a system 20 in this embodiment includes: a terminal 21, a profile providing server 22, and an operating system providing server 23, where the terminal 21 performs data exchange with the profile providing server 22, and the profile providing server 22 performs data exchange with the operating system providing server 23; the terminal 21 may use a structure of the device embodiment shown in FIG. 11 or FIG. 12, and correspondingly, the terminal 21 may execute the technical solution in any one of the method embodiments in FIG. 2 to FIG. 3, and FIG. 6A, FIG. 6B, FIG. 6C, and FIG. 6D, and implementation principles and technical effects of the apparatus are similar and are not described herein again; the profile providing server 22 may use a structure of the device embodiment shown in FIG. 13, and correspondingly, the profile providing server 22 may execute the technical solution in the method embodiment shown in FIG. 4 or FIG. 6A, FIG. 6B, FIG. 6C, and FIG. 6D, and implementation principles and technical effects of the apparatus are similar and are not described herein again; and the operating system providing server 23 may use a structure of the device embodiment shown in FIG. 14, and correspondingly, the operating system providing server 23 may execute the technical solution in the method embodiment shown in FIG. 5 or FIG. 6A, FIG. 6B, FIG. 6C, and FIG. 6D, and implementation principles and technical effects of the apparatus are similar and are not described herein again.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An operating system establishing method, comprising:
    starting a just enough operating system, and enabling a basic application service, wherein the just enough operating system comprises a basic application service module, an operating system core library module, and an instruction translation module, wherein the operating system core library module comprises file storage, execution of supporting the basic application service, Internet access, and input/output, wherein the basic application service comprises a call application, a short message service (SMS) message application, a browser application, and an input method application;
    acquiring a data selection instruction input by a user, the data selection instruction comprising an identification (ID) of the user and an ID of a profile providing server that is selected by the user, the profile providing server configured to provide a service;
    determining the profile providing server according to the ID of the profile providing server in the data selection instruction;
    accessing, by addressing, the profile providing server according to the ID of the user;
    acquiring operating system information from the profile providing server, the operating system information comprising information about an operating system providing server;
    accessing the operating system providing server according to the operating system information; and
    acquiring an operating system copy, and deploying the operating system copy in an operating system container to establish an operating system, wherein the operating system container is configured to run the operating system copy.

2. The method according to claim 1, wherein after acquiring the operating system copy, and deploying the operating system copy in the operating system container to establish the operating system, the method further comprises:
    sending a profile request message to the profile providing server, acquiring a profile of the user from the profile providing server, and completing personalized processing of the operating system according to the profile of the user, wherein the profile request message comprises an ID of the user and the information about the operating system providing server.

3. The method according to claim 1, wherein after starting the just enough operating system, and enabling the basic application service, the method further comprises:
    acquiring a data exchange function enabling instruction input by the user, and enabling a data exchange service according to the data exchange function enabling instruction.

4. A terminal, comprising:
    an input device, configured to acquire a data selection instruction input by a user, the data selection instruction comprising an identification (ID) of the user and an ID of a profile providing server that is selected by the user, the profile providing server configured to provide a service; and
    a processor, configured to:
        start a just enough operating system, and enable a basic application service, wherein the just enough operating system comprises a basic application service module, an operating system core library module, and an instruction translation module, wherein the operating system core library module comprises file storage, execution of supporting the basic application service, Internet access, and input/output, wherein the basic application service comprises a call application, an SMS message application, a browser application, and an input method application;
        determine the profile providing server according to the ID of the profile providing server in the data selection instruction;
        access, by addressing, the profile providing server according to the ID of the user;
        acquire operating system information from the profile providing server, the operating system information comprising information about an operating system providing server;
        access the operating system providing server according to the operating system information; and
        acquire an operating system copy, and deploy the operating system copy in an operating system container to establish an operating system, wherein the operating system container is configured to run the operating system copy.

5. The terminal according to claim 4, further comprising:
    a transmitter, configured to send a profile request message to the profile providing server, wherein the profile request message comprises the ID of the user and the information about the operating system providing server; and
    wherein the processor is further configured to: acquire a profile of the user from the profile providing server, and complete personalized processing of the operating system according to the profile of the user.

6. The terminal according to claim 4, wherein:
    the input device is further configured to acquire a data exchange function enabling instruction input by the user; and
    the processor is further configured to enable a data exchange service according to the data exchange function enabling instruction.

7. A profile providing server, comprising:
    a receiver, configured to receive a data request message sent by a terminal; and
    a transmitter, configured to send, to the terminal, information about a user according to the data request message, the information enabling the terminal to establish an operating system according to the information about the user,
    wherein the profile providing server is selected by the terminal after the terminal acquires a data selection instruction input by the user and before the receiver receives the data request message, wherein the data selection instruction comprises an identification (ID) of the user and an ID of the profile providing server, wherein the receiver is further configured to receive an operating system information request message sent by the terminal, the operating system information request message comprising the ID of the user; and the transmitter is further configured to send, to the terminal, operating system information according to the operating system information request message, the operating system information comprising information about an operating system providing server that is accessible by the terminal to acquire an operating system copy.

8. The server according to claim 7, wherein:

the receiver is further configured to receive a profile request message sent by the terminal, wherein the profile request message comprises the ID of the user and the information about the operating system providing server; and the transmitter is configured to send, to the terminal, a profile of the user according to the profile request message, wherein the profile of the user comprises personalized information of the operating system.

\* \* \* \* \*